United States Patent
Kim

(10) Patent No.: US 11,347,105 B2
(45) Date of Patent: May 31, 2022

(54) DISPLAY DEVICE INCLUDING LIGHT GUIDE PLATE WITH A PLURALITY OF ACCOMMODATING SPACES FORMED

(71) Applicant: SAMSUNG ELECTRONICS CO., LTD., Suwon-si (KR)

(72) Inventor: Soon Jung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/289,088

(22) PCT Filed: Oct. 23, 2019

(86) PCT No.: PCT/KR2019/013992
§ 371 (c)(1),
(2) Date: Apr. 27, 2021

(87) PCT Pub. No.: WO2020/096236
PCT Pub. Date: May 14, 2020

(65) Prior Publication Data
US 2021/0405456 A1 Dec. 30, 2021

(30) Foreign Application Priority Data
Nov. 7, 2018 (KR) .......................... 10-2018-0136117

(51) Int. Cl.
*G02F 1/13357* (2006.01)
*F21V 8/00* (2006.01)

(52) U.S. Cl.
CPC ..... *G02F 1/133608* (2013.01); *G02B 6/0055* (2013.01); *G02F 1/133603* (2013.01); *G02F 1/133605* (2013.01)

(58) Field of Classification Search
CPC ................... G02F 1/133602–133614
See application file for complete search history.

(56) References Cited

U.S. PATENT DOCUMENTS 8,506,148 B2 * 8/2013 Shimizu ............ G02F 1/133603
  362/606
8,783,890 B2 * 7/2014 Kasai ................ G02F 1/133608
  362/97.2
(Continued)

FOREIGN PATENT DOCUMENTS

KR   10-2011-0064744 A   6/2011
KR     10-1255287 B1     4/2013
(Continued)

OTHER PUBLICATIONS

International Search Report (PCT/ISA/210) dated Feb. 26, 2020 issued by the International Searching Authority in International Application No. PCT/KR2019/013992.

*Primary Examiner* — Keith G. Delahoussaye
(74) *Attorney, Agent, or Firm* — Sughrue Mion, PLLC

(57) ABSTRACT

Provided is a display device having a thin thickness and capable of performing fine local dimming. The display device includes: a display panel; a bottom chassis positioned behind the display panel; a light source module rested on the bottom chassis and including a plurality of light sources and a plurality of printed circuit boards on which the plurality of light sources are arranged, each light source being a light emitting diode to which a reflective lens is applied; and a light guide plate rested on the bottom chassis, wherein, in the light guide plate, a plurality of accommodating holes accommodating the plurality of light sources are formed at locations corresponding to the plurality of light sources.

7 Claims, 7 Drawing Sheets

(56) References Cited

U.S. PATENT DOCUMENTS

2006/0291205 A1   12/2006  Jeon
2011/0013376 A1    1/2011  Kim et al.
2011/0037740 A1*   2/2011  Yamaguchi .......... G02B 6/0031
                                                                       345/204

FOREIGN PATENT DOCUMENTS

| KR | 10-2015-0024959 A | 3/2015 |
| KR | 10-1763188 B1 | 8/2017 |
| KR | 10-2018-0062224 A | 6/2018 |
| WO | 2012/030085 A1 | 3/2012 |

* cited by examiner

DISPLAY DEVICE INCLUDING LIGHT GUIDE PLATE WITH A PLURALITY OF ACCOMMODATING SPACES FORMED

TECHNICAL FIELD

The present disclosure relates to a display device having a thin thickness and capable of performing local dimming.

BACKGROUND ART

Generally, a display device is a device of displaying a screen, and includes a monitor, a television, etc.

There are various kinds of display devices, such as a display device using a Cathode Ray Tube, a display device using Light Emitting Diodes (LEDs), a display device using Organic Light Emitting Diodes (OLEDs), a display device using Active-Matrix Organic Light Emitting Diodes (AMO-LED), a Liquid Crystal Display (LCD), or an e-paper display.

A display device includes a display panel displaying images optically, and a Back Light Unit (BLU) providing light to the display panel.

In general, the display panel receives light from the backlight unit located at the back to display images, because the display panel itself cannot emit light.

As a light source of a backlight unit, a Cold Cathode Fluorescent Lamp (CCFL) has been typically used; however, recently, Light Emitting Diodes (LEDs) are mainly used because the LEDs have advantages in view of many ways, such as weight, a thickness, consumption power, a color gamut, a switching time, a life cycle, etc.

Backlight units are classified into an edge type and a direct type, according to positions of LEDs as light sources that emit light.

An edge type backlight unit is positioned to cause LEDs to irradiate light to the edges of a light guide plate, and light irradiated by the LEDs changes its traveling direction by the light guide plate to be guided to a display panel. In a direct type backlight unit, LEDs are arranged throughout the entire rear side of a display panel to transfer light directly to the display panel without any light guide plate.

Local dimming is technology of greatly improving a contrast ratio and consumption power by dividing a backlight into a plurality of areas and associating brightness with image signals to turn off the backlight or reduce light at an area corresponding to a dark part of an image and increase brightness at a bright area.

To implement fine local dimming, the direct type is more appropriate than the edge type. However, the direct type requires an optical distance from light sources, and has a thicker thickness than the edge type.

DISCLOSURE

Technical Problem

An aspect of the disclosure is directed to providing a display device having a thin thickness and capable of performing fine local dimming.

Technical Solution

A display device according to an embodiment of the disclosure includes: a display panel; a bottom chassis positioned behind the display panel; a light source module rested on the bottom chassis and including a plurality of light sources and a plurality of printed circuit boards on which the plurality of light sources are arranged, each light source being a light emitting diode to which a reflective lens is applied; and a light guide plate rested on the bottom chassis, wherein, in the light guide plate, a plurality of accommodating holes accommodating the plurality of light sources are formed at locations corresponding to the plurality of light sources.

A diameter of each accommodating hole may be greater than a diameter of a light source accommodated in the accommodating hole.

The display device may further include a reflective sheet positioned between the light guide plate and the bottom chassis and reflecting light emitted from the plurality of light sources toward the display panel.

The reflective sheet may be attached on the bottom chassis to be positioned between the light source module and the bottom chassis.

The reflective sheet may be attached on the light guide plate to be positioned between the light source module and the light guide plate.

The reflective sheet may include a plurality of openings formed at locations corresponding to the plurality of accommodating holes.

The plurality of accommodating holes may open in a direction toward the display panel.

Light emitted from the plurality of light sources may radiate toward the light guide plate in a radial direction of the plurality of light sources.

A portion of the light radiating toward the light guide plate in the radial direction of the plurality of light sources may be transferred to the display panel through the reflective sheet.

Advantageous Effects

According to embodiments of the disclosure, a display device may have a thin thickness while being capable of performing fine local dimming.

MODES OF THE INVENTION

Figure 1:
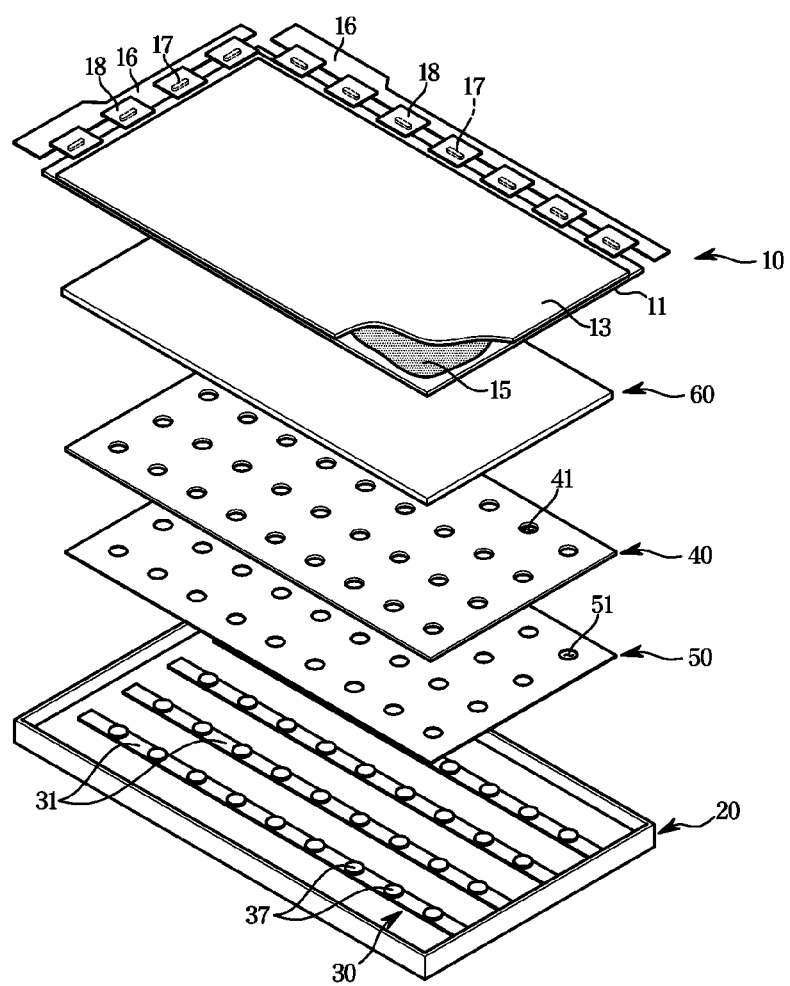
FIG. 1 is an exploded perspective view of a display device according to an embodiment of the disclosure.

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

Like reference numerals or symbols denoted in the drawings of the present specification represent members or components that perform the substantially same functions.

Also, the terms used in the present specification are merely used to describe embodiments, and are not intended to limit and/or restrict the disclosure. An expression used in the singular encompasses the expression of the plural, unless it has a clearly different meaning in the context. In the present specification, it is to be understood that the terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

Also, it will be understood that, although the terms "first", "second", etc., may be used herein to describe various components, these components should not be limited by these terms. The above terms are used only to distinguish one component from another. For example, a first component discussed below could be termed a second component, and similarly, a second component may be termed a first component without departing from the scope of right of the disclosure. As used herein, the term "and/or" includes any and all combinations of one or more of associated listed items.

Meanwhile, in the following description, the terms "front surface", "rear surface", "front direction", "rear direction", "upper portion", "lower portion", "upper end", "lower end", "left side", and "right side", etc. are defined based on the drawings, and the shapes and positions of the corresponding components are not limited by the terms.

Hereinafter, embodiments of the disclosure will be described in detail with reference to the accompanying drawings.

Figure 2:
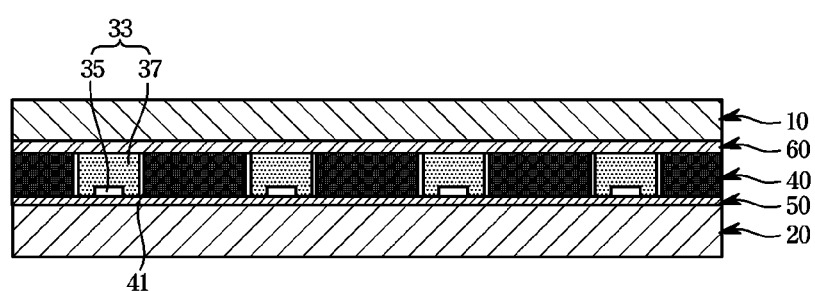
FIG. 2 is a schematic cross-sectional view of a display device according to an embodiment of the disclosure.
Figure 3:
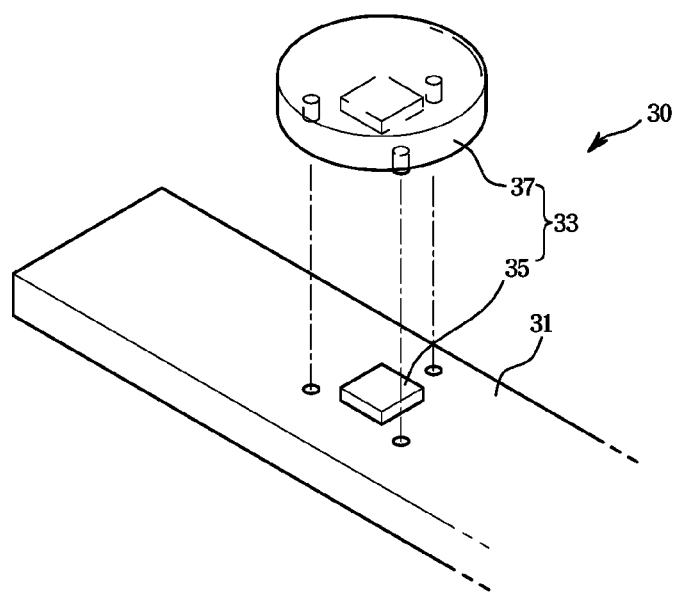
FIG. 3 illustrates a light source module according to an embodiment of the disclosure.

FIG. 1 is an exploded perspective view of a display device according to an embodiment of the disclosure. FIG. 2 is a schematic cross-sectional view of a display device according to an embodiment of the disclosure. FIG. 3 illustrates a light source module according to an embodiment of the disclosure.

As illustrated in FIGS. 1, 2, and 3, a display panel may include a display panel 10 on which images are displayed, a bottom chassis 20 positioned behind the display panel 10 and forming a rear outer appearance of the display device, a light source module 30 rested on the bottom chassis 20, a light guide plate 40 rested on the bottom chassis 20 and guiding light transferred from the light source module 30 to the display panel 10, a reflective sheet 50 positioned behind the light guide plate 40 and reflecting light exiting a rear surface of the light guide plate 40 toward a front direction, and an optical sheet 60 positioned between the display panel 10 and the light guide plate 40 and improving optical characteristics of light guided to the display panel 10 by the light guide plate 40.

The display panel 10 may be a liquid crystal panel using liquid crystals, and include a Thin Film Transistor (TFT) substrate 11 on which TFTs are formed, a Color Filter (CF) substrate 13 that is opposite to the TFT substrate 11, and liquid crystals 15 provided between the TFT substrate 11 and the CF substrate 13.

The TFT substrate 11 may be a transparent glass substrate on which TFTs being switching devices are arranged in a matrix form.

Source terminals of the TFTs may be connected to a data line, gate terminals of the TFTs may be connected to a gate line, and drain terminals of the TFTs may be connected to a pixel electrode made of a transparent conductive material.

The CF substrate 13 may be opposite to the TFT substrate 11 in such a way to be spaced a predefined distance from the TFT substrate 11. The CF substrate 13 may be a substrate on which RGB (Red, Green, and Blue) pixels are formed by a thin film process, wherein the RGB pixels are color pixels that express preset colors by receiving light.

On a front surface of the CF substrate 13, a common electrode made of a transparent conductive material may be formed.

In the display panel 10 having the above-described configuration, when a supply voltage is applied to the gate terminals of the TFTs, an electric field may be formed between the pixel electrode and the common electrode, and an arrangement of the liquid crystals 15 interposed between the TFT substrate 11 and the CF substrate 13 may change by the electric field.

The display panel 10 may form an image by adjusting the arrangement of the liquid crystals 15. However, because the display panel 10 itself is incapable of emitting light, the display panel 10 may display an image by receiving light from the light source module 30 located behind the display panel 10.

Below the display panel 10, a driving printed circuit board 16 for supplying a driving signal to the display panel 10 may be positioned, and the display panel 10 may be electrically connected to the driving printed circuit board 16 by a plurality of flexible circuit films 18 on which one surface driving chips 17 are mounted.

The bottom chassis 20 may be positioned behind the display panel 10, and form the rear outer appearance of the display device, although not limited thereto.

However, a cover member forming the rear outer appearance of the display device may be provided behind the bottom chassis 20.

The light source module 30 and the light guide plate 40 may be rested on the bottom chassis 20.

The light source module 30 may be positioned behind the display panel 10 which itself is incapable of emitting light, and may supply light to the display panel 10.

The light source module 30 may include a plurality of printed circuit boards 31 on which conductive patterns are formed and which are rested on the bottom chassis 20, and a plurality of light sources 33 arranged on the plurality of printed circuit boards 31.

Each light source 33 may include a light emitting diode (LED) 35 mounted on a front surface of the printed circuit board 31 and being opposite to the rear surface of the display panel 10, and a reflective lens 37 installed on the LED 35 to reflect light generated by the LED 35.

The light source 33 may be accommodated in an accommodating hole of the light guide plate 40 which will be described later, and accordingly, no optical distance between the light source 33 and the light guide plate 40 may be generated, thereby reducing a thickness of the display device.

Each printed circuit board 31 may extend to have its length in one direction to correspond to the display panel 10, and the plurality of printed circuit boards 31 may be spaced parallel to each other and rested on the bottom chassis 20.

A plurality of LEDs 35 may be arranged on the printed circuit board 31 in such a way to be spaced in a longitudinal direction of the printed circuit board 31, and a plurality of reflective lenses 37 may be respectively installed on the respective LEDs 35.

The light guide plate 40 may be positioned behind the display panel 10, and guide light irradiated from the light source module 30 to the display panel 10.

The light guide plate 40 may be rested on the bottom chassis 20, and include a plurality of accommodating holes 41 formed at locations corresponding to the plurality of light sources 33.

The plurality of light sources 33 may be respectively accommodated in the plurality of accommodating holes 41.

Because the plurality of light sources 33 are respectively accommodated in the plurality of accommodating holes, fine local dimming may be performed, and no optical distance between the light sources 33 and the light guide plate 40 may be generated, which results in a reduction in thickness of the display device.

Each accommodating hole 41 may have a diameter that is greater than that of the corresponding light source 33, that is, the reflective lens 37 accommodated in the accommodating hole 41.

Because the light source 33 is provided with the reflective lens 37, the accommodating hole 41 may open in a direction toward the display panel 10.

The reflective sheet 50 may be positioned behind the light guide plate 40 and reflect light exiting the rear surface of the light guide plate 40 toward the front direction.

The reflective sheet 50 may be attached on the light guide plate 40 to be positioned between the light source module 30 and the light guide plate 40.

The reflective sheet 50 may include a plurality of openings 51 positioned to correspond to the plurality of accommodating holes 41 formed in the light guide plate 40.

Light emitted from the light sources 33 may radiate toward the light guide plate 40, a portion of the light radiating toward the light guide plate 40 may radiate toward the rear side of the light guide plate 40, and the light radiating toward the rear side of the light guide plate 40 may be transferred to the display panel 10 through the reflective sheet 50, which will be described later.

The optical sheet 60 may be positioned between the display panel 10 and the light guide plate 40 to improve optical characteristics of light guided to the display panel 10 through the light guide plate 40.

The optical sheet 60 may include a diffuser sheet (not shown) for diffusing light guided to the display panel 10 by the light guide plate 40 to improve brightness uniformity, a condensing sheet (not shown) for aligning a direction of light diffused by the diffuser sheet such that the light is vertically incident to the display panel 10, and a protective sheet (not shown) for protecting the condensing sheet.

Figure 4:
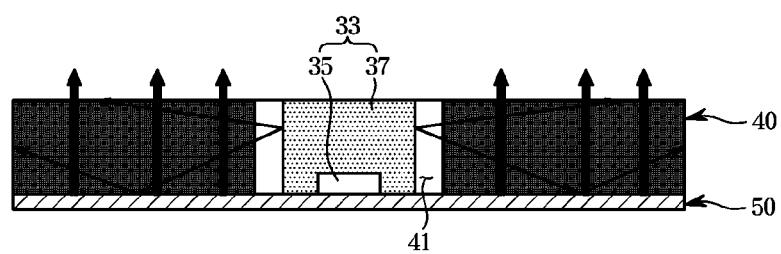
FIG. 4 illustrates a state in which light is emitted from a light source according to an embodiment of the disclosure.

FIG. 4 illustrates a state in which light is emitted from a light source according to an embodiment of the disclosure.

As illustrated in FIG. 4, light emitted by the light source 33, that is, the LED 35 may radiate in a radial direction of the light source 33 through the reflective lens 37.

The light radiating in the radial direction of the light source 33 may radiate toward the light guide plate 40, and a major portion of the light may be transferred to the display panel 10 through the light guide plate 40.

However, a portion of the light radiating in the radial direction of the light source 33 may radiate toward the rear side of the light guide plate 40 and be then transferred to the display panel 10 through the reflective sheet 50.

Figure 5:
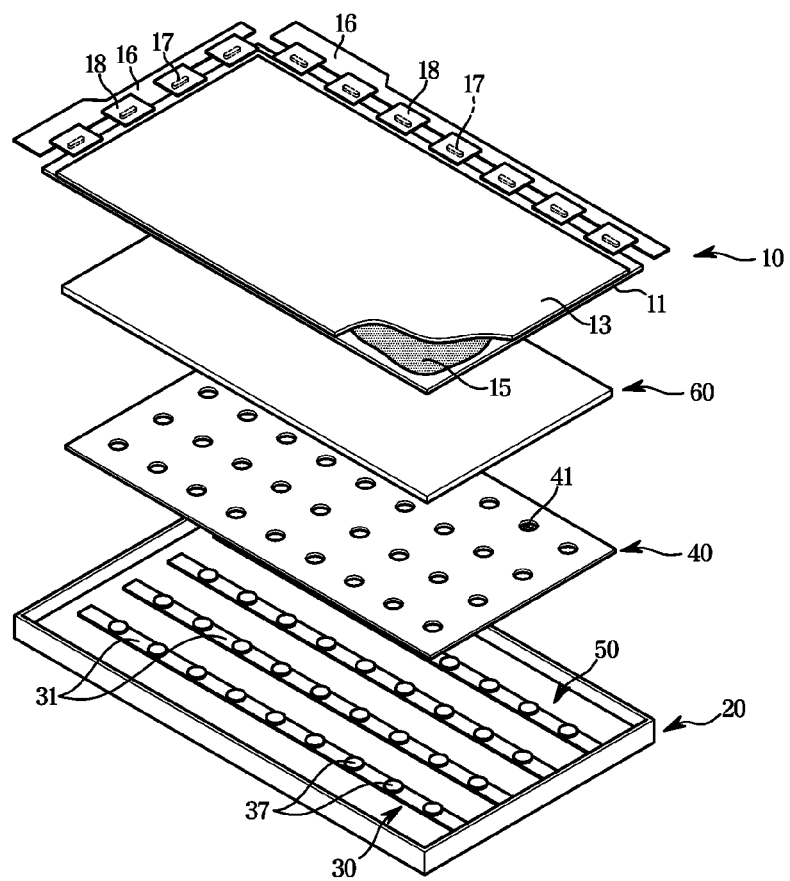
FIG. 5 illustrates a state in which a reflective sheet is attached on a bottom chassis in the display device illustrated in FIG. 1.

FIG. 5 illustrates a state in which a reflective sheet is attached on a bottom chassis in the display device illustrated in FIG. 1.

As illustrated in FIG. 5, the reflective sheet 50 may be attached on the bottom chassis 20 to be positioned between the light source module 30 and the bottom chassis 20.

In the case in which the reflective sheet 50 is attached on the bottom chassis 20, the openings 51 of the reflective sheet 50, as illustrated in FIG. 1, may be not formed.

Figure 6:
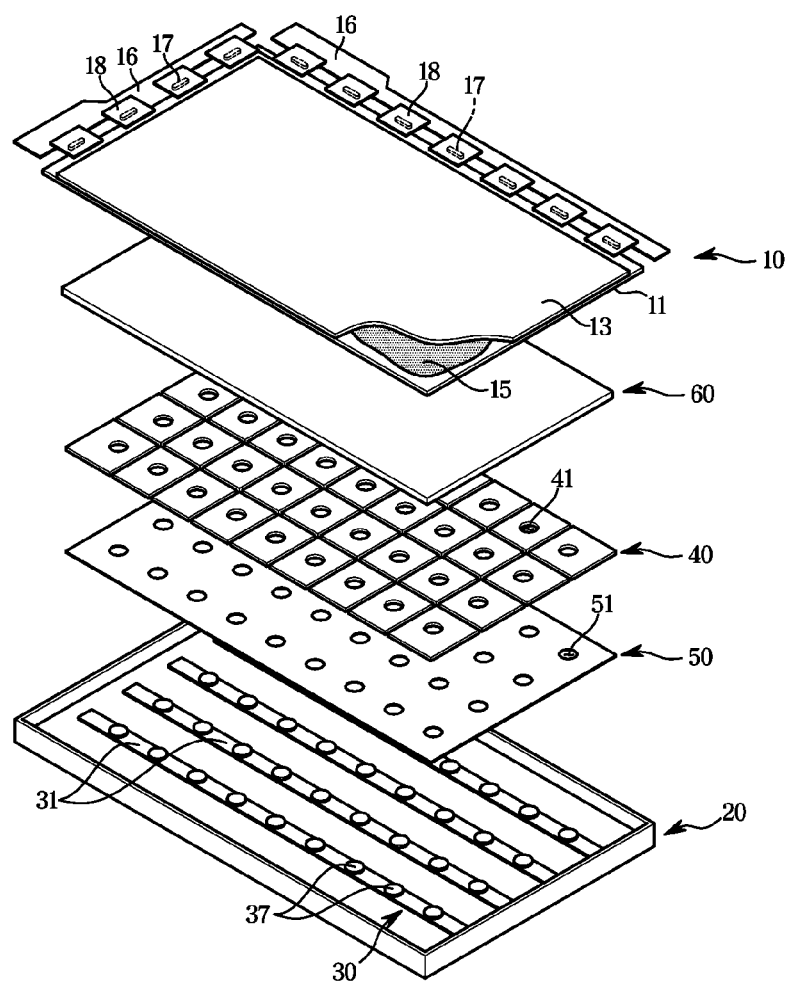
FIG. 6 is an exploded perspective view of a display device according to another embodiment of the disclosure.

FIG. 6 is an exploded perspective view of a display device according to another embodiment of the disclosure.

As illustrated in FIG. 6, the light guide plate 40 may be positioned behind the display panel 10 and guide light irradiated from the light source module 30 to the display panel 10.

The light guide plate 40 may be rested on the bottom chassis 20, and include the plurality of accommodating holes 41 formed at locations corresponding to the plurality of light sources 33.

The plurality of light sources 33 may be respectively accommodated in the plurality of accommodating holes 41.

Because the plurality of light sources 33 are respectively accommodated in the plurality of accommodating holes 41, fine local dimming may be performed, and no optical distance between the light sources 33 and the light guide plate 40 may be generated, which results in a reduction in thickness of the display device.

Each accommodating hole 41 may have a diameter that is greater than that of the light source 33, that is, the reflective lens 37 accommodated in the accommodating hole 41.

Because the light source 33 is provided with the reflective lens 37, the accommodating hole 41 may open in the direction toward the display panel 10.

The light guide plate 40 may be divided into a plurality of pieces respectively corresponding to the plurality of accommodating holes 41.

In the case in which the light guide plate 40 is divided into a plurality of pieces respectively corresponding to the plurality of accommodating holes 41, the plurality of light sources 33 may be independently controlled, resulting in implementation of finer local dimming.

The reflective sheet 50 may be positioned behind the light guide plate 40 to reflect light exiting the rear surface of the light guide plate 40 toward the front direction.

The reflective sheet 50 may be attached on the light guide plate 40 to be positioned between the light source module 30 and the light guide plate 40.

The reflective sheet 50 may include the plurality of openings 51 formed at locations corresponding to the plurality of accommodating holes 41 formed in the light guide plate 40.

Figure 7:
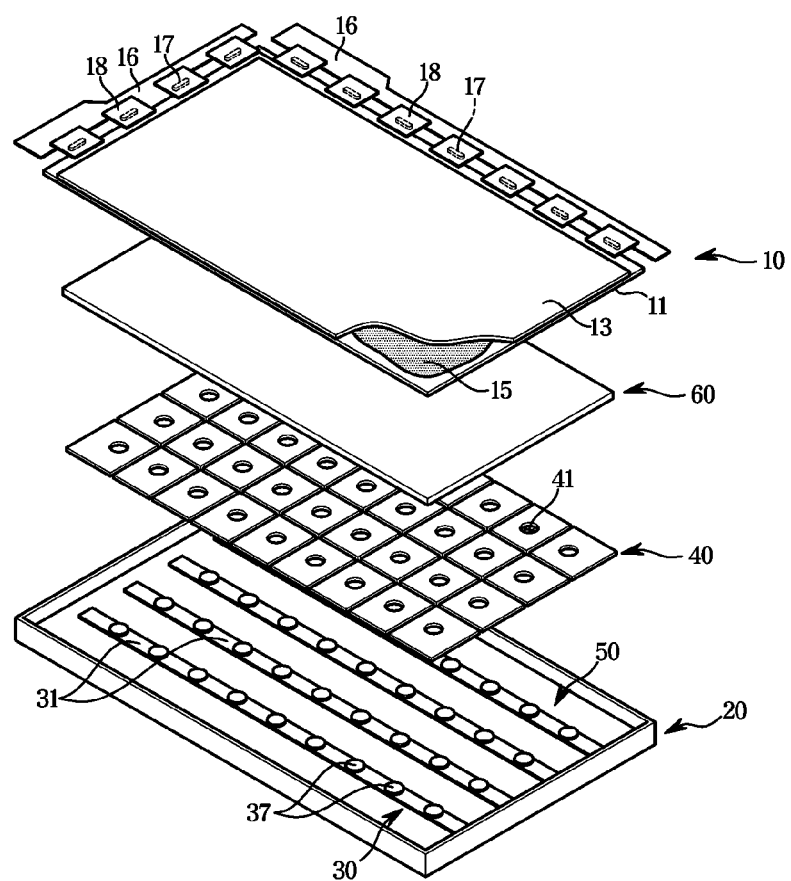
FIG. 7 illustrates a state in which a reflective sheet is attached on a bottom chassis in the display device illustrated in FIG. 6.

FIG. 7 illustrates a state in which a reflective sheet is attached on a bottom chassis in the display device illustrated in FIG. 6.

As illustrated in FIG. 7, the reflective sheet 50 may be attached on the bottom chassis 20 to be positioned between the light source module 30 and the bottom chassis 20.

In the case in which the reflective sheet 50 is attached on the bottom chassis 20, the openings 51 of the reflective sheet 50, as illustrated in FIG. 6, may be not formed.

While the above descriptions about the display device, given with reference to the accompanying drawings, are based on specific shapes and directions, various modifications and changes may be made by those of skilled in the art, and such various modification and changes should be interpreted to be included in the scope of rights of the disclosure.

The invention claimed is:

1. A display device comprising:
a display panel;
a bottom chassis positioned behind the display panel;

a light source module provided on the bottom chassis and including a plurality of light sources and a plurality of printed circuit boards on which the plurality of light sources are arranged, each light source of the plurality of light sources being a light emitting diode to which a reflective lens is applied;

a light guide plate provided on the bottom chassis, wherein, in the light guide plate, a plurality of accommodating holes accommodating the plurality of light sources are formed at locations corresponding to the plurality of light sources; and a reflective sheet positioned between the light guide plate and the bottom chassis and reflecting light emitted from the plurality of light sources toward the display panel, the reflective sheet attached on the light guide plate to be positioned between the light source module and the light guide plate.

2. The display device of claim 1, wherein a diameter of each accommodating hole is greater than a diameter of a light source accommodated in the accommodating hole.

3. The display device of claim 1, wherein the reflective sheet comprises a plurality of openings formed at locations corresponding to the plurality of accommodating holes.

4. The display device of claim 2, wherein the plurality of accommodating holes open in a direction toward the display panel.

5. The display device of claim 1, wherein light emitted from the plurality of light sources radiates toward the light guide plate in a radial direction of the plurality of light sources.

6. The display device of claim 5, wherein a portion of the light radiating toward the light guide plate in the radial direction of the plurality of light sources is transferred to the display panel through the reflective sheet.

7. A display device comprising:
a display panel;
a bottom chassis positioned behind the display panel;
a light source module provided on the bottom chassis and including a plurality of light sources and a plurality of printed circuit boards on which the plurality of light sources are arranged, each light source of the plurality of light sources being a light emitting diode to which a reflective lens is applied;

a light guide plate provided on the bottom chassis, wherein, in the light guide plate, a plurality of accommodating holes accommodating the plurality of light sources are formed at locations corresponding to the plurality of light sources; and a reflective sheet positioned between the light guide plate and the bottom chassis and reflecting light emitted from the plurality of light sources toward the display panel, the reflective sheet attached on the bottom chassis to be positioned between the light source module and the bottom chassis.

* * * * *